(12) United States Patent
Kim (10) Patent No.: US 7,388,632 B2
(45) Date of Patent: Jun. 17, 2008

(54) LIQUID CRYSTAL DISPLAY DEVICE HAVING A SECOND BLACK MATRIX LAYER COVERING SURFACES OF A FIRST BLACK MATRIX LAYER INCLUDING THE SIDES THEREOF

(75) Inventor: Moon Goo Kim, Kumi-shi (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 561 days.

(21) Appl. No.: 11/024,897

(22) Filed: Dec. 29, 2004

(65) Prior Publication Data

US 2005/0140857 A1    Jun. 30, 2005

(30) Foreign Application Priority Data

Dec. 29, 2003 (KR) ...................... 10-2003-0098978

(51) Int. Cl.
*G02F 1/1333* (2006.01)

(52) U.S. Cl. .......................... 349/110; 349/111

(58) Field of Classification Search ................ 349/110, 349/111

See application file for complete search history.

(56) References Cited

U.S. PATENT DOCUMENTS

| 5,783,338 | A  | * | 7/1998  | Cho ............................... 430/7 |
| 6,461,775 | B1 | * | 10/2002 | Pokorny et al. ................ 430/7 |
| 6,587,169 | B1 | * | 7/2003  | Yamazaki et al. .......... 349/110 |
| 6,771,342 | B1 | * | 8/2004  | Nishi et al. .................. 349/141 |
| 7,126,660 | B2 | * | 10/2006 | Woo ........................... 349/141 |

* cited by examiner

*Primary Examiner*—David Nelms
*Assistant Examiner*—John Heyman
(74) *Attorney, Agent, or Firm*—Brinks Hofer Gilson & Lione

(57) ABSTRACT

A TN mode or IPS mode LCD device includes lower and upper substrates that face each other and a liquid crystal disposed therebetween. Pixel regions are defined on the substrates. A multi-layer structure of black matrix layers are formed in regions of one of the substrates other than the pixel regions. The first black matrix layer is formed from an opaque metal while the second black matrix layer is formed from resin. The second black matrix layer completely covers the first black matrix layer. The combined multi-layer black matrix structure has an optical density of about 4.5 to 5.

21 Claims, 6 Drawing Sheets

LIQUID CRYSTAL DISPLAY DEVICE HAVING A SECOND BLACK MATRIX LAYER COVERING SURFACES OF A FIRST BLACK MATRIX LAYER INCLUDING THE SIDES THEREOF

This present invention claims the benefit of the Korean Application No. P2003-98978 filed on Dec. 29, 2003, which are hereby incorporated by reference.

BACKGROUND

1. Field

The present invention relates to a liquid crystal display (LCD) device, and more particularly, to an LCD device and a method for fabricating the same, to improve a contrast ratio of the LCD device by using a black matrix layer of resin.

2. Discussion of the Related Art

Demands for various display devices have increased with development of an information society. Accordingly, much effort have been expended to research and develop various flat display devices such as liquid crystal display (LCD), plasma display panel (PDP), electroluminescent display (ELD), and vacuum fluorescent display (VFD). Some species of flat display devices have already been applied to displays for various equipment.

Among the various flat display devices, liquid crystal display (LCD) devices have been most widely used due to advantageous characteristics of thin profile, lightness in weight, and low power consumption, whereby the LCD devices provide a substitute for a Cathode Ray Tube (CRT). In addition to mobile type LCD devices such as a display for a notebook computer, LCD devices have been developed for computer monitors and televisions to receive and display broadcasting signals.

Despite various technical developments in the LCD technology having applications in different fields, research in enhancing the picture quality of the LCD device has been, in some respects, lacking as compared to other features and advantages of the LCD device. In order to use LCD devices in various fields as a general display, the key to developing LCD devices depends on whether LCD devices can implement a high quality picture, such as high resolution and high luminance with a large-sized screen, while still maintaining lightness in weight, thin profile, and low power consumption.

A general LCD device includes an LCD panel for displaying a picture image, and a driving part for applying a driving signal to the LCD panel. The LCD panel includes first and second glass substrates being bonded to each other at a predetermined interval therebetween, and a liquid crystal layer injected between the first and second glass substrates.

The first glass substrate (TFT array substrate) includes a plurality of gate and data lines, a plurality of pixel electrodes, and a plurality of thin film transistors. The plurality of gate lines are formed on the first glass substrate at fixed intervals, and the plurality of data lines are formed in perpendicular to the plurality of gate lines at fixed intervals. Then, the plurality of pixel electrodes, arranged in a matrix-type configuration, is respectively formed in pixel regions defined by the plurality of gate and data lines crossing each other. The plurality of thin film transistors are switched according to signals of the gate lines for transmitting signals of the data lines to the respective pixel electrodes.

The second glass substrate (color filter substrate) includes a black matrix layer that excludes light from regions except the pixel regions of the first substrate, R(red)/G(green)/B (blue) color filter layer displaying various colors, and a common electrode to obtain the picture image. In case of an In-Plane Switching (IPS) mode LCD device, the common electrode is formed on the first glass substrate.

Next, a predetermined space is maintained between the first and second glass substrates by spacers, and the first and second substrates are bonded to each other by a seal pattern having a liquid crystal injection inlet. At this time, the liquid crystal layer is formed according to a liquid crystal injection method, in which the liquid crystal injection inlet is dipped into a vessel having liquid crystal while maintaining a vacuum state in the predetermined space between the first and second glass substrates. That is, the liquid crystal is injected between the first and second substrates by an osmotic action. Then, the liquid crystal injection inlet is sealed with a sealant.

Meanwhile, the LCD device is driven according to the optical anisotropy and polarizability of liquid crystal material. Liquid crystal molecules are aligned using directional characteristics because the liquid crystal molecules each has long and thin shapes. In this respect, an induced electric field is applied to the liquid crystal for controlling the alignment direction of the liquid crystal molecules. That is, if the alignment direction of the liquid crystal molecules is controlled by the induced electric field, the light is polarized and changed by the optical anisotropy of the liquid crystal, thereby displaying the picture image. In this state, the liquid crystal is classified into positive (+) type liquid crystal having positive dielectric anisotropy and negative (−) type liquid crystal having negative dielectric anisotropy according to electrical characteristics of the liquid crystal. In the positive (+) type liquid crystal, a longitudinal (major) axis of a positive (+) liquid crystal molecule is in parallel to the electric field applied to the liquid crystal. Meanwhile, in the negative (−) type liquid crystal, a longitudinal (major) axis of a negative (−) liquid crystal molecule is perpendicular to the electric field applied to the liquid crystal.

Figure 1:
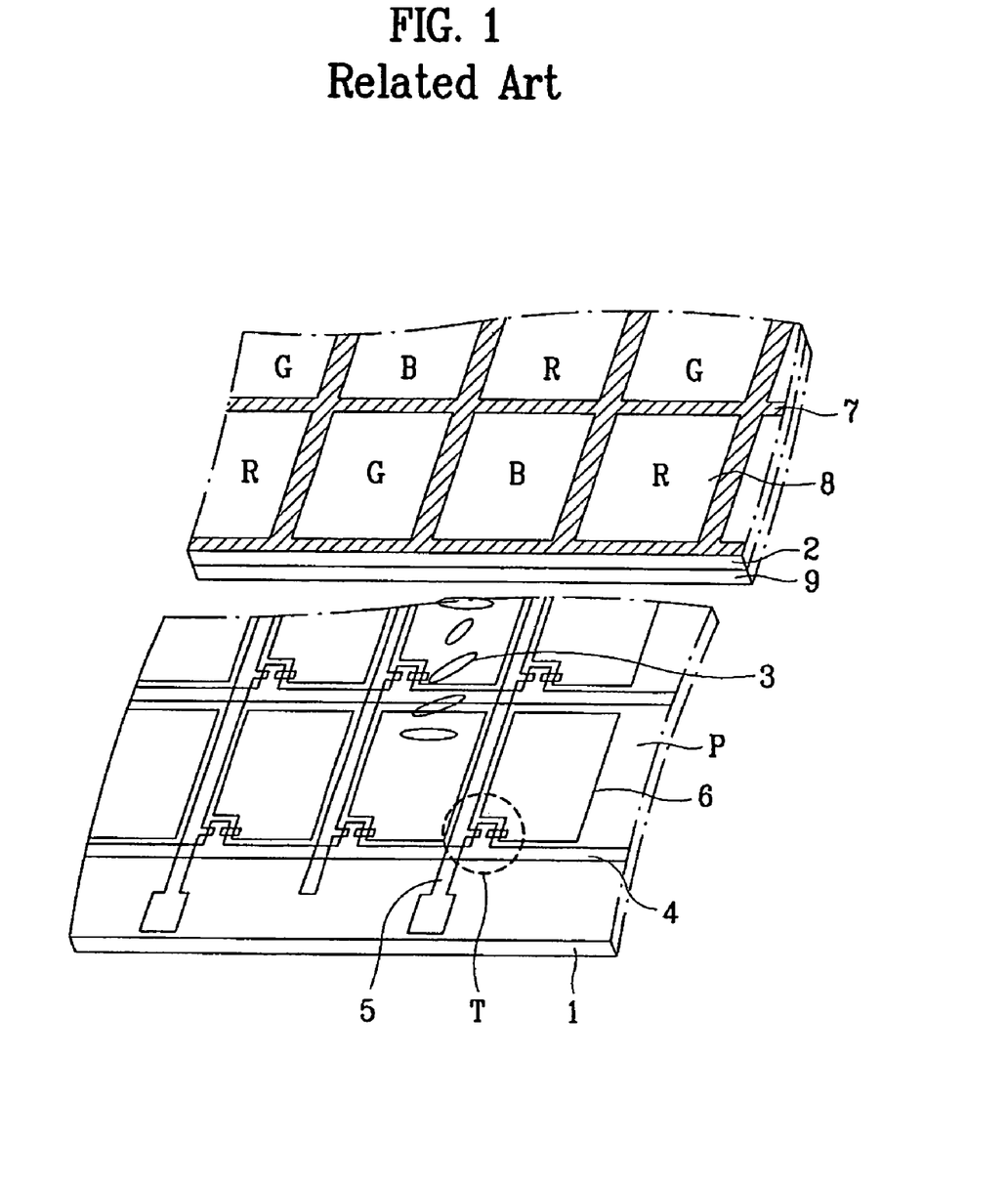
FIG. 1 is an exploded perspective view of showing some portions of a TN mode LCD device according to the related art.

FIG. 1 is an exploded perspective view illustrating a general Twisted Nematic (TN) mode LCD device. As shown in FIG. 1, the TN mode LCD device includes a lower substrate 1 and an upper substrate 2 bonded to each other at a predetermined interval therebetween, and a liquid crystal layer 3 injected between the lower and upper substrates 1 and 2.

More specifically, the lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals, and the plurality of data lines 5 are formed in perpendicular to the plurality of gate lines 4 at fixed intervals, thereby defining a plurality of pixel regions P. Then, the plurality of pixel electrodes 6 are respectively formed in the pixel regions P defined by the plurality of gate and data lines 4 and 5 crossing each other, and the plurality of thin film transistors T are respectively formed at crossing portions of the plurality of gate and data lines 4 and 5.

Next, the upper substrate 2 includes a black matrix layer 7 that excludes light from regions except the pixel regions P, R(red)/G(green)/B(blue) color filter layers 8 for displaying various colors, and a common electrode 9 for displaying a picture image.

At this time, the thin film transistor T includes a gate electrode, a gate insulating layer (not shown), an active layer, a source electrode, and a drain electrode. The gate electrode projects from the gate line 4, and the gate insulating layer (not shown) is formed on an entire surface of the lower substrate. Then, the active layer is formed on the gate insulating layer above the gate electrode. The source electrode projects from the data line 5, and the drain electrode is formed in opposite to the source electrode. Also, the aforementioned pixel electrode 6 is formed of transparent conductive metal having great transmittance, such as ITO (Indium-Tin-Oxide).

In the aforementioned LCD device, liquid crystal molecules of the liquid crystal layer 3 on the pixel electrode 6 are aligned with a signal applied from the thin film transistor T, and light transmittance is controlled according to alignment of the liquid crystal, thereby displaying the picture image. In this state, an LCD panel drives the liquid crystal molecules by an electric field perpendicular to the lower and upper substrates. This method obtains great transmittance and high aperture ratio. Also, it is possible to prevent liquid crystal cells from being damaged by static electricity since the common electrode 9 of the upper substrate 2 serves as the ground. However, in case of driving the liquid crystal molecules by the electric field perpendicular to the lower and upper substrates, it is difficult to obtain a wide viewing angle.

Figure 2:
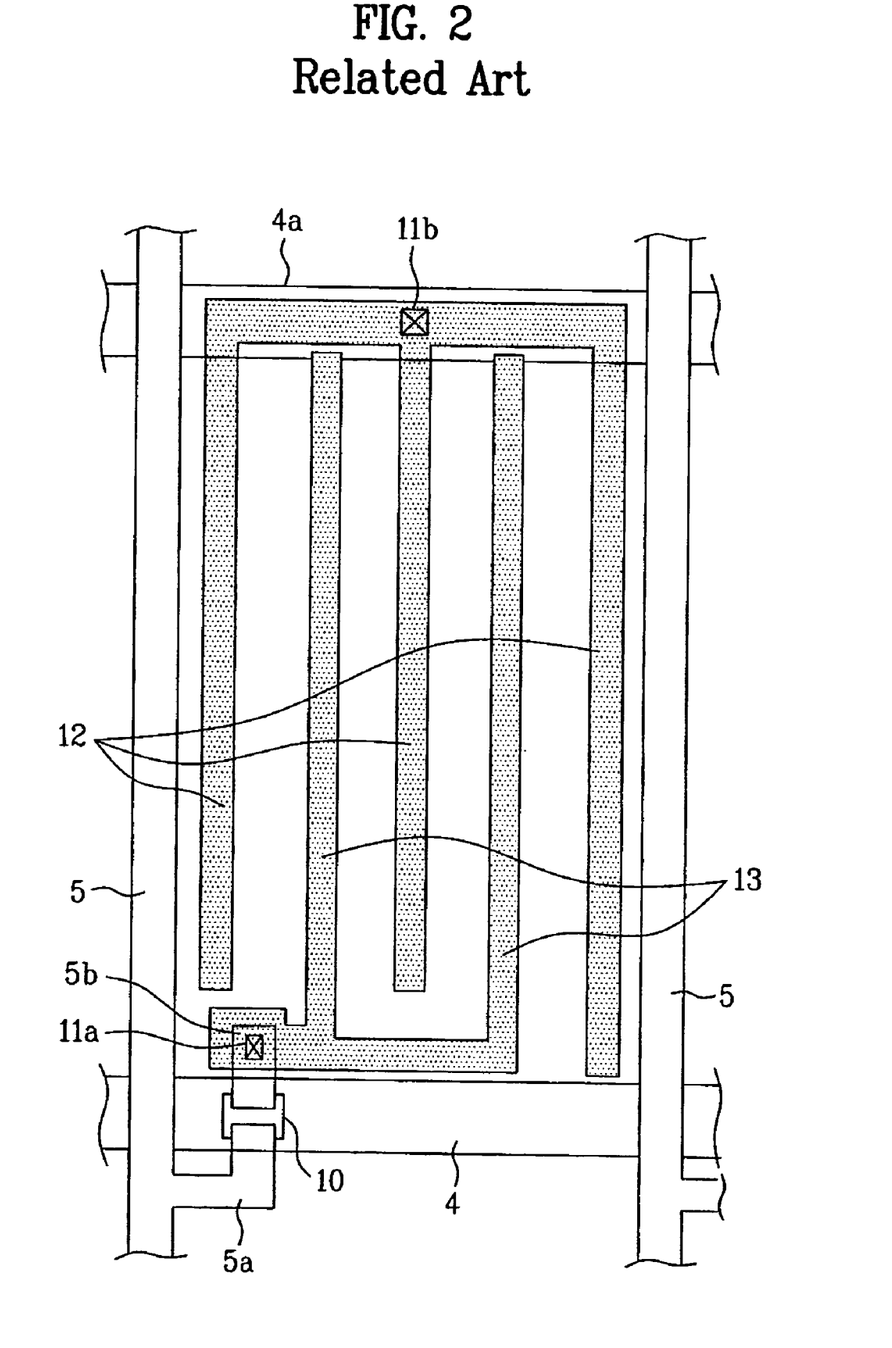
FIG. 2 is a plane view of showing a unit pixel of an IPS mode LCD device according to the related art.

In order to overcome these problems, an In-Plane Switching (IPS) mode LCD device has been proposed recently. Hereinafter, a related art IPS mode LCD device will be described with reference to the accompanying drawings. FIG. 2 is a plane view of showing a unit pixel region of an IPS mode LCD device according to the related art. In the related art IPS mode LCD device, as shown in FIG. 2, a gate line 4 and a data line 5 crossing each other are formed on a transparent lower substrate, thereby defining a pixel region. Then, a thin film transistor is formed at a crossing portion of the gate and data lines 4 and 5. Also, a common line 4a is formed in parallel with the gate line 4 in the pixel region.

At this time, the thin film transistor includes a gate electrode of occupying one portion of the gate line 4, a gate insulating layer (not shown) formed on an entire surface of the lower substrate including the gate electrode, an active layer 10 formed on the gate insulating layer above the gate electrode, a source electrode 5a projecting from the data line 5, and a drain electrode 5b formed at a predetermined interval from the source electrode 5a.

Also, a passivation layer (not shown) is formed on the entire surface of the lower substrate including the data line 5, wherein the passivation layer is formed of a silicon nitride layer. Furthermore, contact holes 11a and 11b are formed above the drain electrode 5b and the common line 4a. On the passivation layer of the pixel region, common electrodes 12 and pixel electrodes 13 are alternately formed in parallel at a predetermined interval.

At this time, the plurality of common electrodes 12 are formed within one pixel region in parallel with the data line, wherein each of the common electrodes 12 is connected with the common line 4a by the contact hole 11b. Also, each of the pixel electrodes 13 is connected with the drain electrode 5b of the thin film transistor by the contact hole 11a. The common electrode 12 and the pixel electrode 13 are formed of transparent conductive layers.

Although not shown, an upper substrate is formed opposite to the lower substrate, wherein the upper substrate includes a black matrix layer, color filter layers, and an overcoat layer. The black matrix layer prevents light leakage on remaining portions except the pixel regions, the color filter layers are provided for realizing colors in the respective pixel regions, and the overcoat layer is formed on an entire surface of the upper substrate including the color filter layers.

In the aforementioned LCD device, the upper substrate having the black matrix layer will be described in detail.

Figure 3:
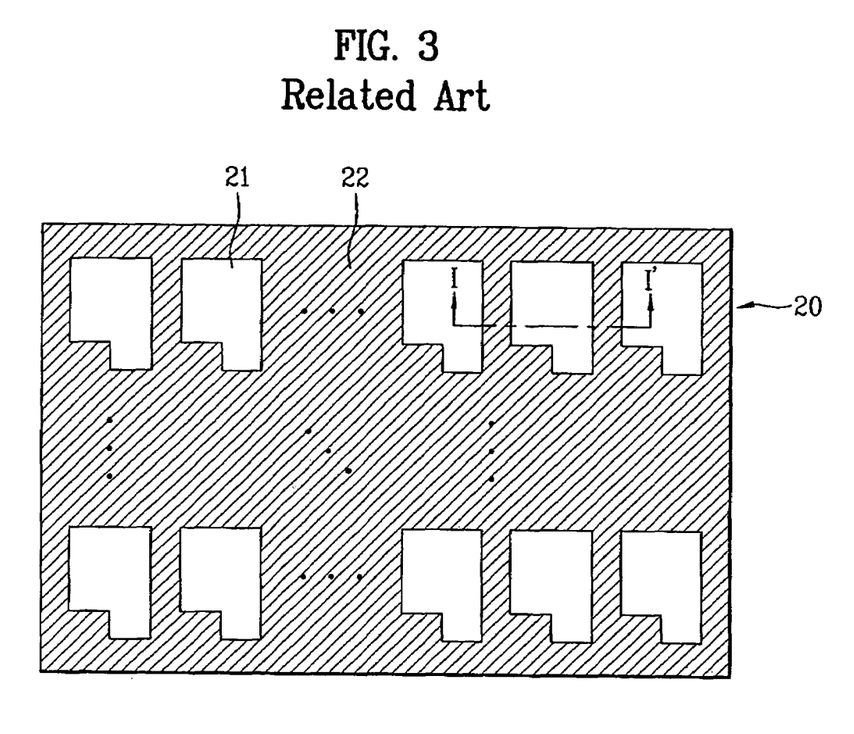
FIG. 3 is a plane view of showing an upper substrate of an LCD device according to the related art.
Figure 4:
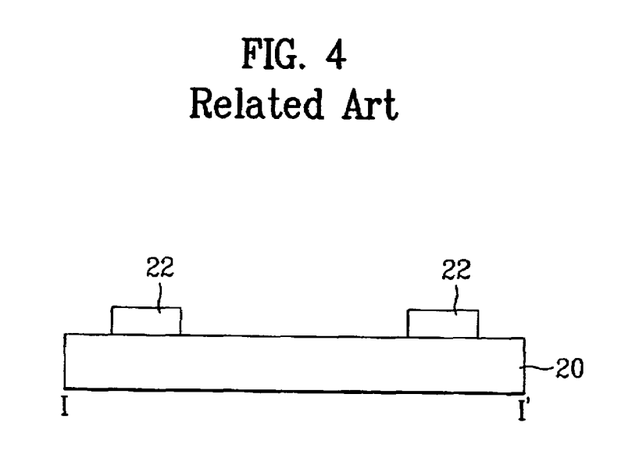
FIG. 4 is a cross sectional view along I-I' of FIG. 3.

FIG. 3 is a plane view of the upper substrate of the LCD device according to the related art. FIG. 4 is a cross sectional view along I-I' of FIG. 3.

As explained above, on the upper substrate 2, the black matrix layer 22 is formed on the remaining portions except the pixel regions 21. At this time, the black matrix layer 22 may be formed of a light-shielding metal material such as chrome Cr, or an acrylic resin formed by mixing carbon with a metal oxide material.

In the TN mode LCD device of FIG. 1, the black matrix layer 22 may be formed of the light-shielding metal material.

However, in case of the IPS mode LCD device of FIG. 2, if the black matrix layer 22 is formed of the light-shielding layer such as chrome Cr, residual images are generated. That is, in the IPS mode LCD device of FIG. 2, the liquid crystal is driven with the IPS mode electric field formed between the common electrode and the pixel electrode, in parallel with the two substrates. In this state, if the black matrix layer of the conductive metal is formed on the upper substrate, electrons are induced to the black matrix layer, thereby distorting the IPS mode electric field formed between the common electrode and the pixel electrode in parallel.

In order to prevent the distortion of the IPS mode electric field, the black matrix layer is formed of resin.

Generally, the LCD device having a luminance of 400 NIT requires the black matrix layer to have an optical density of 4.5 (or more). In the related art, if the black matrix layer 22 is formed of acrylic resin, the acrylic resin has an optical density OD of 3.0 to 4.0. Accordingly, light leakage is generated, thereby lowering the contrast ratio. Also, if the black matrix layer is formed of the acrylic resin, the black matrix layer is thickly formed to increase the optical density. In this case, step difference may be generated in the color filter layer.

As the luminance increases, this problem becomes more serious. That is, the LCD device for the television monitor has a full white luminance of 400 NIT to 600 NIT. Accordingly, for a high resolution LCD device, if the black matrix layer is formed of acrylic resin, the light leakage becomes serious.

SUMMARY

An LCD device realizing high resolution without light leakage is formed using a first black matrix layer of a metal material having a high optical density and a second black matrix layer of resin to cover the first black matrix layer.

By way of introduction only, in one embodiment, a display device comprises first and second substrates facing each other at a predetermined interval, having pixel regions defined therein. A plurality of first black matrix layers are formed on one of the substrates in regions other than the pixel regions and a second black matrix layer covers the first black matrix layers.

In another embodiment, a display device comprises first and second substrates facing first and second substrates facing each other. An optical modulation layer is formed between the first and second substrates. Signal lines are formed on the first substrate. Pixel electrodes are formed on the first substrate in pixel regions. A plurality of first black matrix layers are formed on one of the substrates and a second black matrix layer covers the first black matrix layers. The first and second black matrix layers overlap the signal lines. A common electrode is formed to modulate the optical modulation layer along with the pixel electrodes.

In another embodiment, a display device comprises first and second substrates facing each other. Gate and data lines are formed on the first substrate. The gate and data lines define pixel regions. A common electrode is formed on one of the substrates. Pixel electrodes are formed in the pixel regions on the first substrate. A plurality of first black matrix layers are formed in regions other than the pixel regions and a second black matrix layer covers the first black matrix layers. A color filter layer is formed on and between adjacent first and second black matrix layers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of Which are illustrated in the accompanying drawings. Wherever possible, the same reference numbers will be used throughout the drawings to refer to the same or like parts.

Hereinafter, an LCD device according to an embodiment of the present invention will be described with reference to the accompanying drawings.

Figure 5:
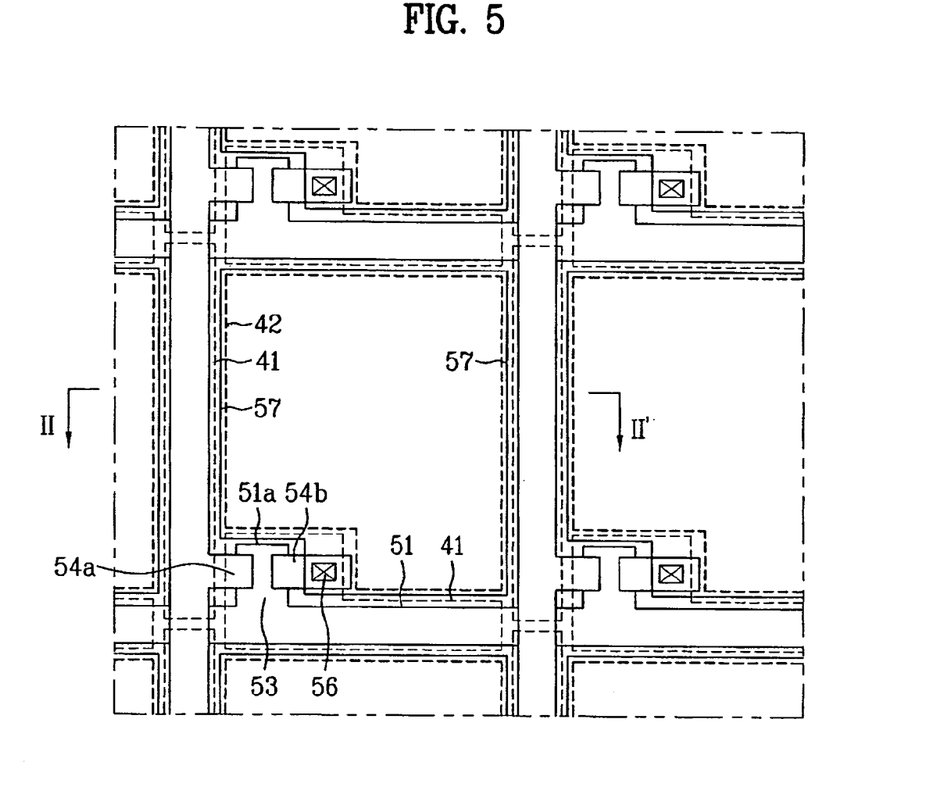
FIG. 5 is a plane view of showing a TN mode LCD device according to the first embodiment of the present invention.
Figure 6:
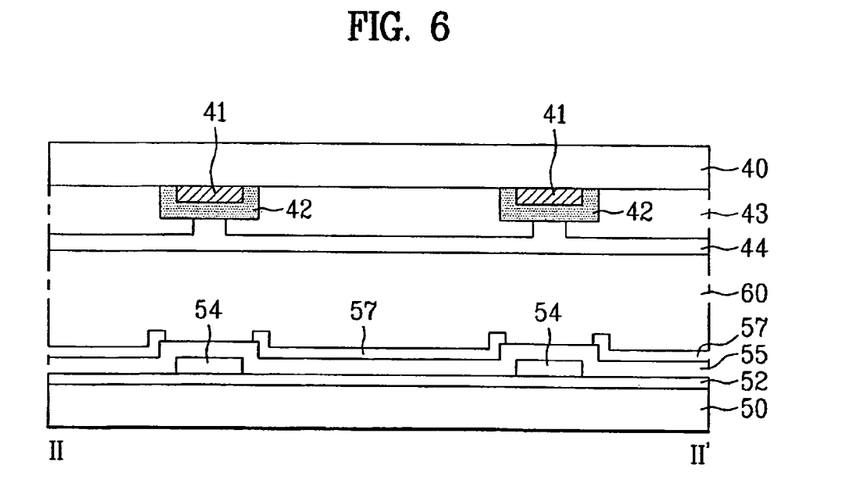
FIG. 6 is a cross sectional view along II-II' of FIG. 5.

FIG. 5 is a plane view of showing a TN mode LCD device according to the first embodiment of the present invention. FIG. 6 is a cross sectional view along II-II' of FIG. 5.

As shown in FIG. 5 and FIG. 6, the TN mode LCD device according to the first embodiment of the present invention includes an upper substrate 40, a lower substrate 50, and a liquid crystal layer 60. At this time, the upper substrate 40 and the lower substrate 50 facing each other are formed at a predetermined interval, and the liquid crystal layer 60 is formed between the upper substrate 40 and the lower substrate 50.

The lower substrate 50 includes a gate line 51, a gate electrode 51a, a gate insulating layer 52, an active layer 53, a data line 54, a source electrode 54a, a drain electrode 54b, a passivation layer 55, and a pixel electrode 57. The gate line 51 is formed in a first direction, and the gate electrode 51a is extended from one portion of the gate line 51. Then, the gate insulating layer 52 is formed on an entire surface of the lower substrate 50 including the gate line 51 and the gate electrode 51a. The gate insulating layer 52 is formed of $SiN_x$ or $SiO_x$. The island-shaped active layer 53 is formed on the gate insulating layer 52 above the gate electrode 51a. Also, the data line 54 is formed on the gate insulating layer 52 in a second direction perpendicular to the gate line 51, to define a pixel region. In addition, the source electrode 54a projecting from the data line 54 is partially overlapped with one side of the active layer 53. The drain electrode 54b is formed at a predetermined interval from the source electrode 54a and is overlapped with the other side of the active layer 53. Also, the passivation layer 55 has a constant thickness on the entire surface of the lower substrate 50, to have a contact hole 56 for exposing the drain electrode 54b. Also, the pixel electrode 57 is formed in the pixel region and is in contact with the drain electrode 54b by the contact hole 56.

The upper substrate 40 includes a plurality of first black matrix layers 41, a second black matrix layer 42, a color filter layer 43, and a common electrode 44. At this time, the plurality of first black matrix layers 41 are separately formed on the upper substrate corresponding to the remaining portions except the pixel regions. Then, the second black matrix layer 42 is formed to cover the plurality of first black matrix layers 41. The color filter layer 43 is formed to realize colors in the pixel regions, and the common electrode 44 is formed on an entire surface of the upper substrate 40 including the color filter layer 43, thereby displaying an image. Herein, the first plurality of first black matrix layers and the second black matrix layer 41 and 42 are formed above the gate line 51, the data line 54 and a thin film transistor.

In the TN mode LCD device, as explained above, the black matrix layer having a dual-layered structure of the first black matrix layer 41 and the second black matrix layer 42 is formed on the upper substrate 40. The first black matrix layer 41 is formed of a light-shielding metal material such as chrome Cr, and the second black matrix layer 42 is formed of acrylic resin to cover the first black matrix layer 41.

If the black matrix layer has the dual-layered structure of the first black matrix layer 41 and the second black matrix layer 42, even though the black matrix layer of the present embodiment has the same total thickness as a black matrix layer of a related art, the black matrix layer of the present embodiment has a high optical density OD of about 4.5 to 5. As a result, the light leakage decreases and contrast ratio improves. Furthermore, it is possible to prevent light leakage from being generated in the edge of the black matrix layer.

The plurality of first black matrix layers 41 are insulated from one another, at least two first black matrix layers 41 are separately formed above the gate line or the data line adjacent to one pixel region, to prevent any effect on the driving of the liquid crystal layer. In FIG. 5, the four first black matrix layers 41 are separately formed in one pixel region.

Meanwhile, the aforementioned method of forming the black matrix layer of the dual-layered structure with the light-shielding metal material and the acrylic resin may be applicable to various modes of the LCD device including an IPS mode LCD device. Hereinafter, an IPS mode LCD device having the black matrix layer of the dual-layered structure with the light-shielding metal material and the acrylic resin will be described with reference to the accompanying drawings.

Figure 7:
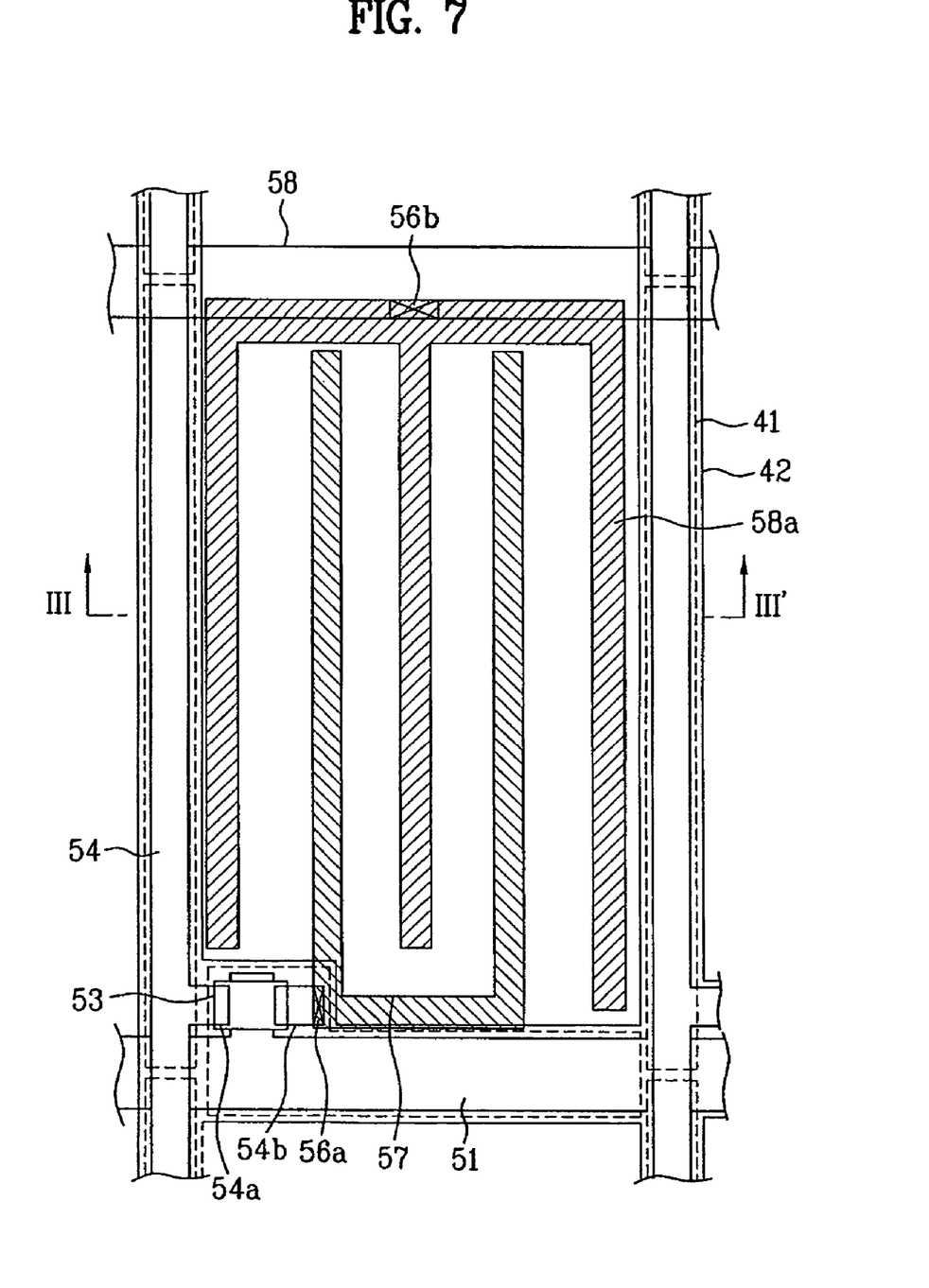
FIG. 7 is a plane view of showing an IPS mode LCD device according to the second embodiment of the present invention.
Figure 8:
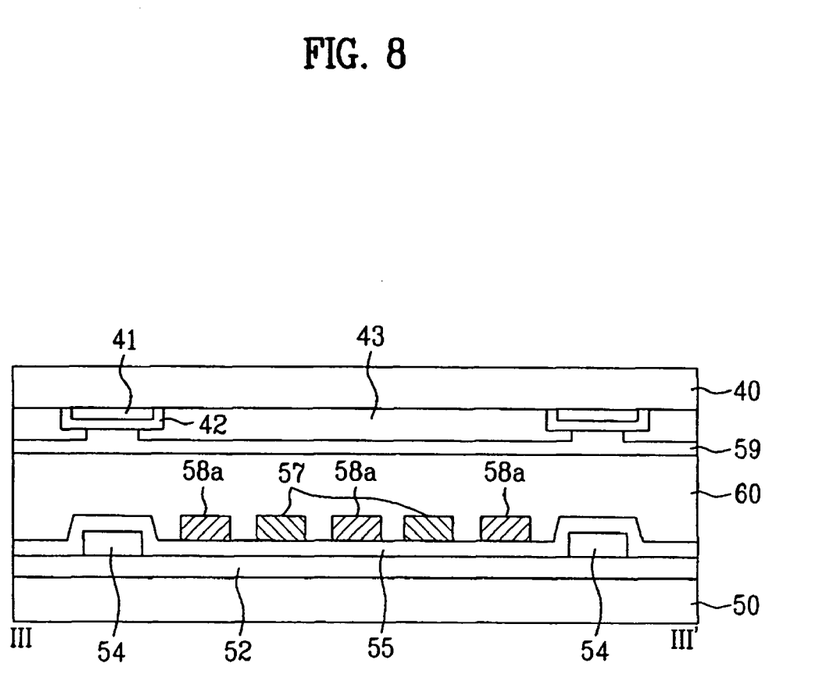
FIG. 8 is a cross sectional view along III-III' of FIG. 7.

FIG. 7 is a plane view of showing an IPS mode LCD device according to the second embodiment of the present invention. FIG. 8 is a cross sectional view along III-III' of FIG. 7.

As shown in FIG. 7 and FIG. 8, the IPS mode LCD device according to the second embodiment of the present invention includes an upper substrate 40, a lower substrate 50, and a liquid crystal layer 60. At this time, the upper substrate 40 and the lower substrate 50 facing each other are formed at a predetermined interval, and the liquid crystal layer 60 is formed between the upper substrate 40 and the lower substrate 50.

The lower substrate 50 includes a gate line 51, a common line 58, a gate electrode 51a, a gate insulating layer 52, an active layer 53, a data line 54, a source electrode 54a, a drain electrode 54b, a passivation layer 55, a pixel electrode 57, and a common electrode 58a. The gate line 51 and the common line 58 are formed in parallel on the lower substrate 50, and the gate electrode 51a is extended from one portion of the gate line 51. Then, the gate insulating layer 52 is formed on an entire surface of the lower substrate 50 including the gate line 51, the common line 58, and the gate electrode 51a, wherein the gate insulating layer 52 is formed of $SiN_x$ or $SiO_x$. The island-shaped active layer 53 is formed on the gate insulating layer 52 above the gate electrode 51a. The data line 54 is formed on the gate insulating layer 52 in perpendicular to the gate line 51 to define a pixel region. The source electrode 54a projecting from the data line 54 is partially overlapped with one side of the active layer 53, and the drain electrode 54b is formed at a predetermined interval from the source electrode 54a and is overlapped with the other side of the active layer 53. The passivation layer 55 is formed on the entire surface of the lower substrate 50. The passivation layer 55 has first and second contact holes 56a and 56b corresponding to the drain electrode 54b and the common line 58. The pixel electrode 57 is formed in the pixel region and is in contact with the drain electrode 54b by the first contact hole 56a. The common electrode 58a is formed in the pixel region and is connected with the common line 58 by the second contact hole 56b.

The plurality of common electrodes 58a are formed in parallel with the data line 54, and the pixel electrode 57 is formed in parallel with the common electrodes 58a in-between at fixed intervals.

The upper substrate 40 includes a plurality of first black matrix layers 41, a second black matrix layer 42, a color filter layer 43, and an overcoat layer 59. The plurality of first black matrix layers 41 are separately formed on the upper substrate 40 corresponding to the remaining portions except the pixel regions. Then, the second black matrix layer 42 is formed to cover the plurality of first black matrix layers 41. The color filter layer 43 is formed to realize colors in the pixel regions, and the overcoat layer 59 is formed on an entire surface of the upper substrate 40 including the color filter layer 43, thereby displaying an image. Herein, the first plurality of first black matrix layers and the second black matrix layer 41 and 42 are formed above the gate line 51, the data line 54 and a thin film transistor.

In the IPS mode LCD device, as explained above, the black matrix layer having a dual-layered structure of the first black matrix layer 41 and the second black matrix layer 42 is formed on the upper substrate 40. At this time, the first black matrix layer 41 is formed of a light-shielding metal material such as chrome Cr, and the second black matrix layer 42 is formed of acrylic resin to cover the first black matrix layer 41.

If the black matrix layer has the dual-layered structure of the first black matrix layer 41 and the second black matrix layer 42, even though the black matrix layer of the present embodiment has the same total thickness as a black matrix layer of a related art, the black matrix layer of the present embodiment has a high optical density OD of about 4.5 to 5. As a result, the light leakage decreases and contrast ratio improves. Furthermore, it is possible to prevent the light leakage from being generated in the edge of the black matrix layer.

As the plurality of first black matrix layers 41 are insulated from one another, at least two first black matrix layers 41 are separately formed above the gate line or the data line adjacent to one pixel region, to prevent any effect on an IPS mode electric field formed between the pixel electrode and the common electrode in parallel with the two substrates. In FIG. 7, the four first black matrix layers 41 are separately formed in one pixel region.

As described above, the LCD device according to the embodiments described have the following advantages.

The black matrix layer has a dual-layered structure of the light-shielding metal material and the acrylic resin, whereby the optical density of the black matrix layer increases, and the contrast ratio improves. In addition, it is possible to prevent the light leakage from being generated in the edge of the black matrix layer, thereby realizing the LCD device having high luminance.

Also, the plurality of first black matrix layers of light-shielding metal material are separately formed in the pixel region. Accordingly, even when the black matrix layer is formed in the IPS mode LCD device having the pixel electrode and the common electrode formed on the lower substrate, it is possible to prevent effects on the IPS mode electric field. That is, even if the light-shielding metal material is used in the IPS mode LCD device, no adverse effects occur on driving the IPS mode LCD device.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A display device comprising:
first and second substrates facing each other at a predetermined interval, having pixel regions defined therein;
a plurality of first black matrix layers formed on one of the substrates in regions other than the pixel regions; and
a second black matrix layer that covers surfaces of the first black matrix layers most distal from the one of the substrates as well as sides of the first black matrix layers.

2. The display device of claim 1, wherein the plurality of first black matrix layers are formed of a light-shielding metal.

3. The display device of claim 2, wherein the light-shielding metal comprises chrome.

4. The display device of claim 1, wherein the second black matrix layer comprises resin.

5. The display device of claim 1, wherein at least two first black matrix layers are formed in one pixel region.

6. The display device of claim 1, wherein the first black matrix layer comprises a conductive material and the second black matrix layer comprises a non-conductive material.

7. The display device of claim 1, wherein the second black matrix layer contacts the first black matrix layers.

8. The display device of claim 1, further comprising:
gate and data lines on the first substrate perpendicular to each other to define the pixel regions;
pixel electrodes on the first substrate in the pixel regions; and
a common electrode formed on the second substrate.

9. The display device of claim 8, wherein the first and second black matrix layers overlap the gate and data lines.

10. The display device of claim 9, further comprising a color filter layer formed between the first black matrix layers, the common electrode formed on the color filter layer and contacting the second black matrix layer.

11. The display device of claim 1, further comprising:
gate and data lines on the first substrate perpendicular to each other to define the pixel regions;
pixel electrodes on the first substrate in the pixel regions;
common lines formed on the first substrate parallel with the gate lines; and
a plurality of common electrodes formed on the first substrate in each pixel region.

12. The display device of claim 11, wherein the first and second black matrix layers overlap the gate and data lines.

13. The display device of claim 12, further comprising:
a color filter layer formed between the first black matrix layers; and
an overcoat layer formed on the color filter layer and contacting the second black matrix layer.

14. The display device of claim 1, wherein the overall combined first and second black matrix layers has an optical density of about 4.5 to 5.

15. A display device comprising:
first and second substrates facing each other;
an optical modulation layer formed between the first and second substrates;
signal lines on the first substrate;
pixel electrodes on the first substrate in pixel regions;
a plurality of first black matrix layers on one of the substrates;
a second black matrix layer covering surfaces of the first black matrix layers most distal from the one of the substrates as well as sides of the first black matrix layers, the first and second black matrix layers overlapping the signal lines; and
a common electrode formed to modulate the optical modulation layer along with the pixel electrodes.

16. The display device of claim 15, wherein the second black matrix layer contacts the first black matrix layers.

17. The display device of claim 15, wherein the pixel electrodes are formed on the first substrate in the pixel regions and the common electrode is formed on the second substrate.

18. The display device of claim 15, further comprising a color filter layer formed between the first black matrix layers, the common electrode formed on the color filter layer and contacting the second black matrix layer.

19. The display device of claim 15, further comprising a common line from which a plurality of the common electrodes extend, the common electrodes and the pixel electrodes formed on the first substrate in each pixel region.

20. The display device of claim 19, further comprising:
a color filter layer formed between the first black matrix layers; and
an overcoat layer formed on the color filter layer and contacting the second black matrix layer.

21. The display device of claim 15, wherein the first black matrix layer comprises a conductive material and the second black matrix layer comprises a non-conductive material.

* * * * *